April 27, 1943.   G. L. CUNNINGHAM   2,317,443
PROCESS FOR MAKING CHLORINE DIOXIDE AND FOR
SEPARATING THE SAME FROM CHLORINE
Filed May 1, 1940
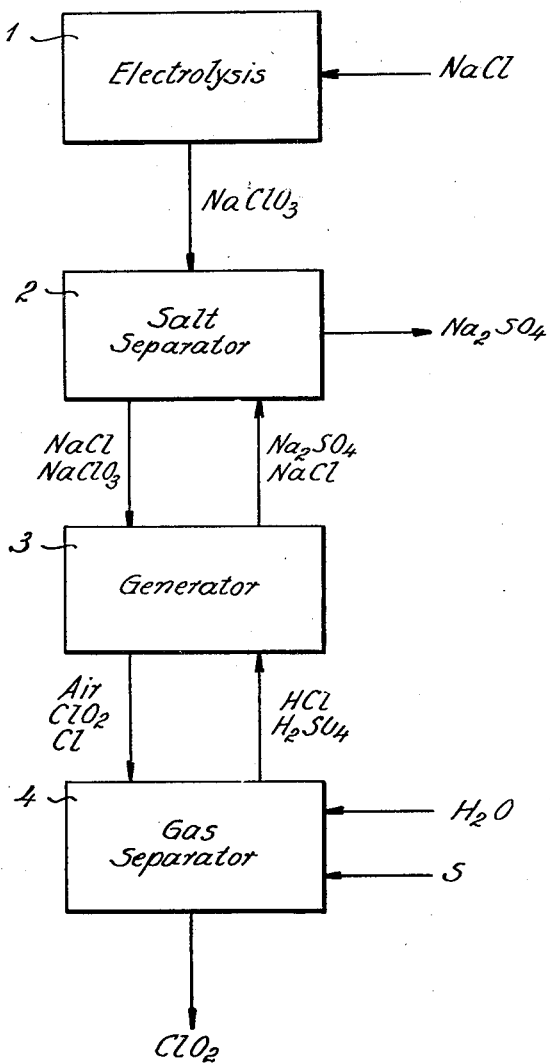
INVENTOR
George Lewis Cunningham
BY
ATTORNEYS

UNITED STATES PATENT OFFICE 2,317,443

PROCESS FOR MAKING CHLORINE DIOXIDE AND FOR SEPARATING THE SAME FROM CHLORINE

George Lewis Cunningham, Niagara Falls, N. Y., assignor to The Mathieson Alkali Works, Inc., New York, N. Y., a corporation of Virginia Application May 1, 1940, Serial No. 332,641

7 Claims. (Cl. 23—152)

This invention relates to improvements in the production of chlorine dioxide. It relates more particularly to improvements in the production of chlorine dioxide with the use of sodium chloride as the source of chlorine, which permits the production of the chlorine dioxide substantially free from chlorine in excellent yields and at low cost. This new process may be carried out without the production of waste products involving loss and disposal difficulties. The invention includes not only this new process for the production of chlorine dioxide, but also the method of separating chlorine and chlorine dioxide which is an important step in the process.

In accordance with the invention, sodium chloride is converted to sodium chlorate by electrolysis in the usual way, the resulting sodium chlorate is acidified, advantageously with hydrochloric and sulfuric acids, with generation of a mixture of chlorine and chlorine dioxide, and the resulting mixture containing chlorine and chlorine dioxide is brought into contact with sulfur and water, the chlorine reacting with the sulfur and water to produce sulfuric and hydrochloric acids, which are used for the acidification of the sodium chlorate.

The step of acidification is, I believe, one which takes place in accordance with the following equation:

$$2NaClO_3 + 2HCl + H_2SO_4 \rightarrow Na_2SO_4 + 2ClO_2 + Cl_2 + 2H_2O$$

although side reactions, of which the following is one, may and do occur:

$$NaClO_3 + 6HCl \rightarrow NaCl + 3Cl_2 + 3H_2O$$

If the sodium chlorate subjected to the acid treatment is substantially free from sodium chloride, and an excess of acid over the stoichiometric quantity of about 10% is used, as much as 90% to 95% or more of the available chlorine of the sodium chlorate may be recovered as chlorine dioxide. For details as to advantageous methods of carrying out this acid treatment of the chlorate, see the application of George P. Vincent, Serial No. 301,066, filed October 24, 1939.

The separation of the chlorine from the chlorine dioxide takes place because chlorine reacts quite rapidly with sulfur and water, whereas chlorine dioxide reacts with sulfur and water quite slowly. I believe that the reaction of chlorine with sulfur and water may be represented by the equation:

$$S + 3Cl_2 + 4H_2O \rightarrow H_2SO_4 + 6HCl$$

and the reaction between chlorine dioxide and sulfur and water in accordance with the equation:

$$6ClO_2 + 5S + 8H_2O \rightarrow 5H_2SO_4 + 6HCl$$

but the reactions may be different from these and side reactions may occur. In any event, from the standpoint of the present invention, the important fact is that the chlorine reacts more rapidly than the chlorine dioxide, and can be substantially completely separated from the chlorine dioxide without substantial loss of chlorine dioxide. In general, the loss of chlorine dioxide through reaction in the separation is minimized by adjusting the period of contact between the gas mixture and the sulfur and water to the minimum consistent with effective separation of the chlorine, using no more water than is necessary for effective separation and solution of the acids formed, using the lowest temperature which gives effective separation and avoiding the use of sulfur which is too finely divided.

Of course, because of the danger of explosion of gas mixtures including chlorine and chlorine dioxide, all such mixtures should include an inert gaseous diluent such as air. Thus air may be passed through the cell or vessel in which the acid treatment of the chlorate takes place in quantities such that the concentration of chlorine dioxide in the gas mixture from the acid treatment is not above that corresponding to a partial pressure of 30 mm. of mercury.

In the separation step, the sulfuric and hydrochloric acids produced dissolve in the excess water present, and the amount of water may be so limited as to produce a concentrated solution of these acids. If the quantity of excess water is too small, and the concentration of sulfuric acid in the resulting aqueous solution becomes too great, hydrogen chloride is evolved as a gas. As the primary product of the process is chlorine dioxide, the proportion of water should not be so small as to result in such evolution of hydrogen chloride gas, but sufficient excess water should be used to cause all of the sulfuric acid and hydrogen chloride formed in the separation step to dissolve.

For purposes of illustration, the invention will be described in detail in connection with the attached drawing, which is a flow sheet illustrating, in diagrammatic fashion, steps which may be used in carrying out the process.

The process may be carried out with introduction of sodium chloride brine into the chlorate cell 1, in which by electrolysis the sodium chloride is converted to sodium chlorate. The sodium chlorate thus produced, advantageously after separation from the sodium chloride brine by crystallization and centrifuging, is then introduced as a concentrated aqueous solution into the separator 2, into which is also introduced the sodium chloride and sodium sulfate from the chlorine dioxide generator 3. In this salt separator, the sodium sulfate crystallizes out and is removed from the process. The sodium chloride-sodium chlorate brine from this salt separator is then introduced into a suitable reaction vessel or generator, in which it is treated with the mixture of sulfuric and hydrochloric acid from the chlorine dioxide-chlorine separator which is used for the separation of chlorine from chlorine dioxide. Into this reaction vessel or generator is also introduced air or other inert gas in sufficient quantity so that the partial pressure of the chlorine dioxide in the gas mixture from the generator does not exceed 25–30 mm. of mercury. In the brine which is supplied to the generator, there should be the smallest practical quantity of sodium chloride, and it is important that the molar ratio of sodium chloride to sodium chlorate should not exceed 1 to 1. Advantageously, the sodium chlorate is supplied as a concentrated aqueous solution.

The gases from the generator, which contain chlorine dioxide and chlorine in admixture with air or other inert gas are led to the separator 4, in which they are brought into contact with finely divided sulfur and water. The temperature in this separator may advantageously be ordinary room temperature, i. e., 20°–30° C. High temperatures should be avoided, because of the nature of the gases being treated. This separator may, for example, be a vertical vessel charged which rhombic sulfur particles, or flowers of sulfur, or other finely divided sulfur, which may be present as a slurry in water, or may be packed into the tower with water passing downwardly through it while the gas mixture passes upwardly countercurrent to the downwardly flowing water. With the use of a sufficient quantity of water, as much as 98% of the chlorine dioxide present in the initial gas mixture may be recovered as chlorine dioxide admixed with air or other inert gas and substantially free from chlorine, 99% or more of the chlorine being removed, together with a small amount of chlorine dioxide. An excess of sulfur is advantageously kept in this separator, either as an aqueous slurry or in the form of packed particles or granules through which the water and gas are passed.

The acid mixture withdrawn from the separator, and which contains hydrochloric and sulfuric acids in controllable concentration, the concentration being controlled by the quantity of water used, is then used for the acid treatment in the chlorine dioxide generator.

The specific step of separating the chlorine dioxide from the chlorine will be further illustrated by the following example, carried out in the laboratory and included here to show the effectiveness of the separation.

*Example.*—A vertical glass tube 90 cm. long and 4 cm. internal diameter was charged with 1000 gr. of rhombic sulfur particles having a size of about 3 mm. This charge occupied about 50% of the internal volume of the tube. A gas mixture containing about equal proportions of chlorine and chlorine dioxide, diluted with air and saturated with water vapor, and in which the partial pressure of the chlorine dioxide was between 20 and 30 mm. of mercury, was passed through the charged tube at the rate of 500 cc. per minute. The temperature was maintained at 20°–25° C. Water was introduced into the top of the tube, countercurrent to the gas stream, at the rate of 10 cc. per minute. The gas mixture and water were passed through the tube until the aqueous solution was 3 normal with respect to acid hydrogen. Substantially 99% of chlorine entering the tube was removed. Upwards of 98% of the chlorine dioxide entering the tube was delivered from the discharge end of the tube substantially free from chlorine.

I claim:

1. The process of separating chlorine dioxide from chlorine which comprises passing a gaseous mixture containing chlorine dioxide and chlorine into contact with sulfur and water.

2. The process of separating chlorine dioxide from chlorine which comprises passing a gaseous mixture containing chlorine dioxide and chlorine into contact with sulfur and water, the amount of water being in excess of that required for complete reaction of all of the chlorine to form hydrochloric and sulfuric acids.

3. The process of separating chlorine dioxide from chlorine which comprises passing a gaseous mixture containing chlorine dioxide and chlorine into contact with sulfur and water, the time of contact being sufficient to cause reaction of substantially all of the chlorine but insufficient to cause reaction of a substantial proportion of the chlorine dioxide.

4. The process as in claim 3 in which the temperature of the gas mixture, the sulfur and water, is maintained around 20° to 30° C.

5. The process of producing chlorine dioxide which comprises reacting in aqueous solution sodium chlorate with a mixture of hydrochloric and sulfuric acid in the presence of sodium chloride, the ratio of sodium chloride to sodium chlorate being not greater than about 1:1, passing the resulting gas mixture containing chlorine and chlorine dioxide into contact with water and sulfur, whereby the chlorine reacts with the sulfur and water to produce hydrochloric and sulfuric acids, and bringing the hydrochloric acid sulfuric acids so formed into contact with fresh sodium chlorate, forming sodium sulfate, chlorine and chlorine dioxide, while recovering the chlorine dioxide substantially free from chlorine.

6. The process as in the preceding claim in which an inert gas is passed into the vessel in which the sodium chlorate is treated with the acid, whereby the mixture of chlorine and chlorine dioxide formed is diluted with an inert gas.

7. The process as in claim 5 in which the sodium sulfate formed in the acid treatment of the sodium chlorate is caused to crystallize out of solution by admixture of the sodium sulfate-containing solution from the acid treatment step with sodium chlorate.

GEORGE LEWIS CUNNINGHAM.